Figure 1:
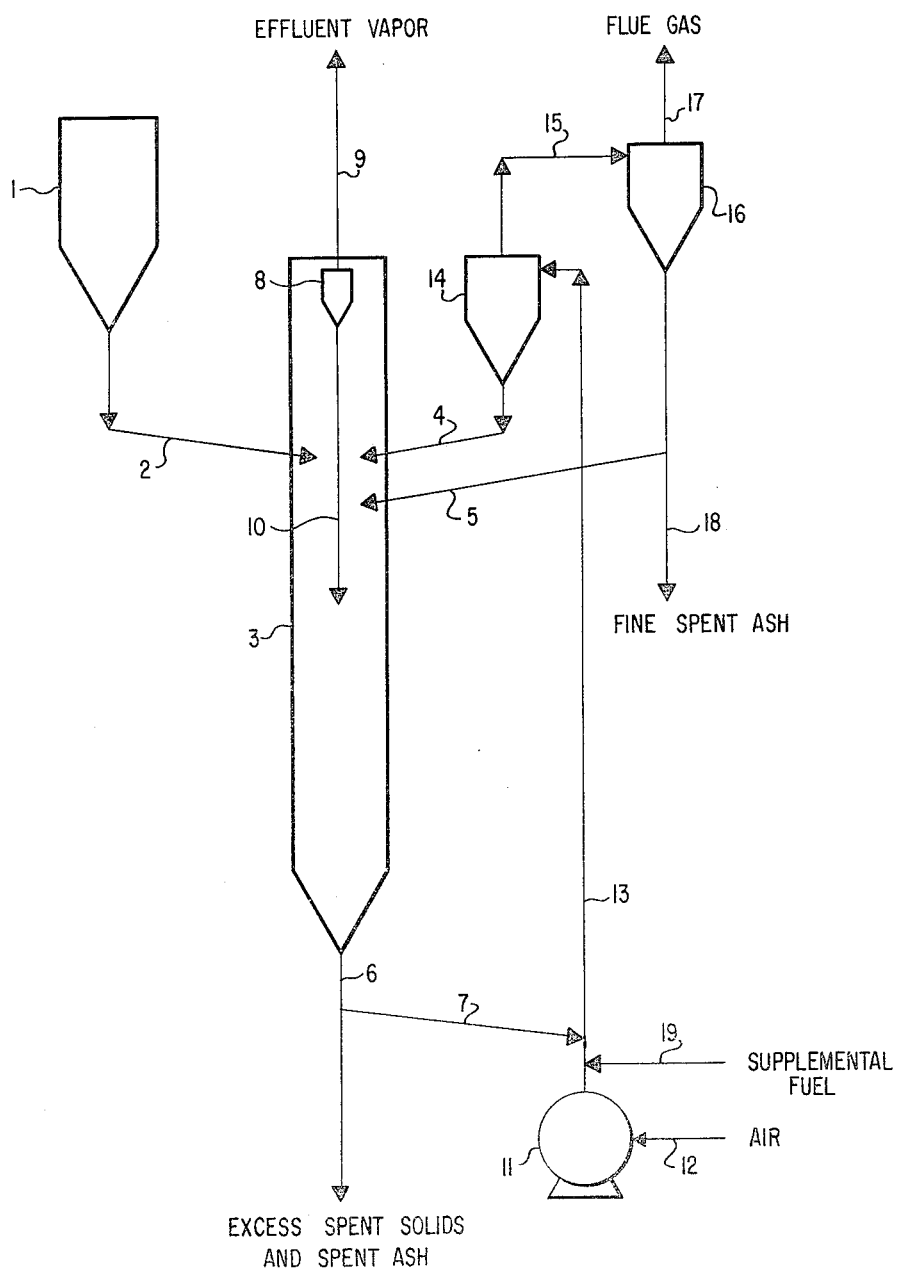

INVENTOR.
CLARENCE L. CRAWFORD

INVENTOR.
CLARENCE L. CRAWFORD
BY
Irons, Birch, Swindler & McKie
ATTORNEYS.

United States Patent Office 3,167,494
Patented Jan. 26, 1965

3,167,494
METHOD FOR PYROLIZING SOLID
CARBONACEOUS MATERIALS
Clarence L. Crawford, Sierra Madre, Calif., assignor to
The Oil Shale Corporation, New York, N.Y., a corporation of Nevada
Filed Dec. 6, 1961, Ser. No. 157,485
12 Claims. (Cl. 208—8)

This invention relates to a method for the production of oil from solid carbonaceous materials, and more specifically, to a method for producing oil from oil shale, bituminous sands, peat, coal and the like wherein pyrolysis of a solid carbonaceous material efficiently and economically is effected by means of heat transferred to the carbonaceous solid from heat-carrying bodies in a confined vertical pyralysis zone.

Solid carbonaceous materials such as oil shales, tar sands, peats and the like contain hydrocarbon values which usually are recovered therefrom by subjecting the carbonaceous solids to a thermal treatment to produce a solid residue and an effluent vapor containing the desired hydrocarbon values.

One basic method for thermal treating such carbonaceous solids to recover the desired hydrocarbon values which has found widespread utilization in the art involves the use of the fluidization technique in effecting the requisite transfer of heat for pyrolysis to the solid carbonaceous materials. Particular embodiments of such a method may or may not involve the utilization of solid heat transfer bodies in addition to the use of a gasiform material which forms the desired fluidized bed of solids in the pyrolysis zone. Although those methods employing the fluidization technique for thermal treating carbonaceous solids generally are considered to be satisfactory in terms of the relatively high degree of heat transfer obtainable thereby, such methods usually are not commercially suitable due to drawbacks which are involved in the application of the fluidization technique to pyrolyzing the solid carbonaceous materials.

In a completely fluidized solids bed to which raw carbonaceous solids are continuously fed to undergo pyrolysis and from which spent solid residues produced thereby are continuously withdrawn the production of the effluent vapor containing the desired hydrocarbon values takes place within a time period which is appreciably less than that period requisite for all of the solids being pyrolyzed to traverse the depth of the fluidized solids bed and reach the spent solid residue outlet from the pyrolysis zone. This is due to the fact that the gas velocities required to produce the desired fluidization of the solids forming the bed materially lengthen the time a particular batch of solids are suspended and maintained within the solids bed. In addition, the problem of holdup of solids in a continuous process using a completely fluidized bed usually is aggravated since a solids bed of greater volume than that required in a batchwise process to effect the desired pyrolysis of a given amount of carbonaceous solids must be employed so that the residual solids from the pyrolysis selectively can be removed continuously. Accordingly, such methods require residence times of solid materials in the pyrolysis zone which undesirably are considerably longer than the times actually required for the attainment of the desired degree of pyrolysis.

In the formation of a completely fluidized solids bed it is highly detrimental when a significant portion of the solids desired to be fluidized are in the form of very finely divided particles. Not only do such finely divided particles greatly impede efforts to achieve fluidization, but significant amounts of very fine material also undesirably become entrained in the fluidizing gas stream.

When the fluidization technique is applied in a method for pyrolyzing solid carbonaceous materials, the inability of the method to suitably handle finely divided solids is extremely unsatisfactory. The detrimental effect of the finely divided raw solids necessitates that an appreciable portion of valuable raw material be discarded or be treated by an alternative method to recover the desired hydrocarbon values resident therein. Even in those instances where it is attempted to include relatively small amounts of the finely divided raw solids in feed streams to a pyrolysis zone containing a completely fluidized carbonaceous solids bed, due to the ease with which the fine materials become entrained in the fluidizing gas, complete pyrolysis thereof is extremely difficult and, in addition, the effluent vapor recovered from the pyrolysis zone contains a greater than usual proportion of suspended solids, the removal of which undesirably entails increased investment and operating expenditures.

The above-mentioned problems encountered in conventional processes resulting from the presence of very fine materials in a completely fluidized bed containing carbonaceous solids being pyrolyzed are further aggravated by the fact that the solid residues produced during the pyrolysis of carbonaceous solids, particularly oil shale, are relatively friable materials. The excessive battering of these friable solid residues in a completely fluidized solids bed undesirably produces an increasing amount of finely divided solids thereby increasing the concentration of "fines" in the solids bed which are detrimental to maintenance of the bed and susceptible to entrainment by the fluidizing gas.

In the majority of the conventional processes utilizing the fluidization technique for thermal treating solid carbonaceous materials to recover the desired hydrocarbon values therefrom, it is standard practice to use an extraneous gas as the gasiform material in the formation of the fluidized solids bed thereby introducing a diluent gas into the vapor recovered from the pyrolysis zone. The presence of extraneous gases in the effluent vapor is undesirable since the presence, per se, or the presence of relatively large amounts of a diluting gas such as steam, nitrogen, flue gas and the like, significantly increases the investment and operating costs of recovering the desired components from the effluent vapor stream and, in some cases, renders recovery of particular components thereof impractical.

An approach suggested for overcoming the disadvantages resulting from the use of a diluent gasiform material in the fluidized pyrolysis of solid carbonaceous materials involves employing at least a portion of the effluent vapor produced in the process as the gasiform material. While such a method does offer a satisfactory solution to component recovery problems formerly encountered from the use of extraneous gasiform materials, a significantly larger amount of vapor than that immediately produced in the pyrolysis zone still must be handled in equipment undesirably well over the minimum sizes. Furthermore, such a method in utilizing a completely fluidized solids bed is not completely satisfactory from a commercial viewpoint for the other reasons stated hereinabove.

Accordingly, it is the primary object of the present invention to provide a method for the production of effluent vapor from a solid carbonaceous material wherein the problems resident in similar methods heretofore available are essentially eliminated.

It is another object of the present invention to provide a method for the production of effluent vapor from a solid carbonaceous material wherein the recovery of effluent vapor is achieved in a more efficient and economical manner than in similar methods heretofore available.

It is an additional object of the present invention to provide a method for the production of effluent vapor from a solid carbonaceous material wherein the hydrocarbon values are recovered from the solid carbonaceous material by thermally treating said material in a pyrolysis zone for a relatively short period of time.

It is a further object of the present invention to provide a method for the production of effluent vapor from a solid carbonaceous material wherein the effluent vapor recovered from a pyrolysis zone in which the carbonaceous solid is subjected to a thermal treatment contains only vapor immediately produced in the pyrolysis zone and is undiluted by extraneous gases.

It is still another object of the present invention to provide a method for the production of effluent vapor from a solid carbonaceous material wherein there is no limitation on the particle size or particle size distribution of the feed stream of raw carbonaceous material to a pyrolysis zone in which the solids are subjected to a thermal treatment.

It is yet another object of the present invention to provide a method for the production of effluent vapor from a solid carbonaceous material wherein the production of finely divided solids in a pyrolysis zone in which the carbonaceous solids are subjected to thermal treatment is appreciably less than that characteristic of similar methods heretofore available.

It is yet an additional object of the present invention to provide a method for the production of effluent vapor from a solid carbonaceous material wherein the carbonaceous solids are subjected to a thermal treatment in relatively inexpensive and simply operated equipment in which heat is imparted to the carbonaceous solids by contacting them with heat-carrying bodies and the desired heat transfer is achieved by agitating the carbonaceous solids and heat-carrying bodies only by vapor immediately produced by the pyrolysis of the carbonaceous solids.

It is a particular object of the present invention to provide a method for producing from oil shale an effluent vapor undiluted by extraneous gases wherein oil shale efficiently and economically is subjected to a thermal treatment in a pyrolysis zone by contacting it with hotter heat-carrying bodies and the requisite heat is transferred to the oil shale without the necessity of external agitating expedients.

Broadly described, the present invention provides a method for continuously producing an effluent vapor from a solid carbonaceous material, which material upon pyrolysis leaves a solid residue, which comprises introducing crushed solid carbonaceous material and hotter solid heat-carrying bodies into the upper region of a vertical pyrolysis zone wherein said heat-carrying bodies contact said carbonaceous material and impart their heat to said carbonaceous material in a non-combustion supporting atmosphere to effect the pyrolysis of said carbonaceous material and produce an effluent vapor, causing said solids to pass downwardly through said pyrolysis zone with the production of a lessening amount of effluent vapor from said carbonaceous material, said effluent vapor produced rising upwardly through said pyrolysis zone and attaining a velocity in the upper region of said pyrolysis zone, such that solids in the uper region of said pyrolysis zone are thoroughly agitated thereby, causing said solids to continue passing downwardly through said pyrolysis zone until a point is reached in the lower region of said pyrolysis zone wherein essentially no gaseous substances are produced or are present, removing said effluent vapor from the top of said pyrolysis zone free from extraneous gases, removing solid residue produced by the pyrolysis of said carbonaceous material from the bottom of said pyrolysis zone, recovering said heat-carrying bodies from the bottom of said pyrolysis zone, reheating said heat-carrying bodies and recycling only heated heat-carrying bodies to the upper region of said pyrolysis zone to contact and effect the pyrolysis of solid carbonaceous material continuously added thereto.

The present invention is based upon a finding that the heat required for pyrolyzing solid carbonaceous materials efficiently and economically can be transferred to the carbonaceous solids from hotter heat-carrying bodies in a vertical pyrolysis zone without the necessity of establishing a completely fluidized solids bed containing the carbonaceous and heat-carrying solids throughout the pyrolysis zone. In accordance with the method of the present invention the carbonaceous solids and heat-carrying bodies are admixed and contacted intimately immediately upon being charged to the top of the pyrolysis zone only by the action of upwardly rising effluent vapor produced in the pyrolysis zone. Thus, the method of the invention does not contemplate the utilization of an extraneous gasiform material and/or the formation of a completely fluidized solids bed throughout the pyrolysis zone.

Accordingly, the present invention provides a method for pyrolyzing carbonaceous solids wherein an effluent vapor is produced from which the desired components easily and economically can be recovered in smaller and simpler equipment than that required in processes using an extraneous fluidizing gas. In addition, in not requiring that the solids in the pyrolysis zone be completely fluidized, the method of the invention suitably is adapted for handling raw carbonaceous solids feed streams containing appreciable amounts of the heretofore unusable finely divided material thereby enabling increased total product yields to be realized from available raw materials.

Furthermore, since the method of the invention does not attempt to fluidize all of the solids in the pyrolysis zone and substantially reduces the friable solid residues formed in the pyrolysis from being battered about and disintegrating into fine materials, the amount of fine material present in vapor leaving the top of the pyrolysis zone is controlled at a level which enables the suspended material to be removed economically by practical means. Another advantage of the method of the invention is that the residence time of a given amount of carbonaceous solids in the pyrolysis zone is significantly less than in conventional processes utilizing the fluidization technique and, consequently, a greater throughput of raw material for a particular pyrolysis unit with the resulting improved process economy is possible by the utilization thereof.

The carbonaceous materials contemplated to be treated by the method of the invention embrace any solid carbonaceous materials containing hydrocarbon values which can be recovered by a thermal treatment of the solid materials. The recovery of the hydrocarbon values is accompanied by the production of a solid residue, usually containing combustible carbon. It will be understood that as employed in the specification and claims of the application the terms "spent material" and "spent solids" are meant to refer to the solid residues produced by the pyrolysis of solid carbonaceous materials, including both partial and complete pyrolysis thereof. Such solid materials which suitably may be treated by the method of the invention include, without limitation, oil shales, bituminous sands, lignites, coals, such as brown coal, peat and the like. Oil shale deposits found in the United States usually are characterized by a recoverable oil content of about 20–50 gallons per ton of shale and upon essentially complete pyrolysis thereof, in addition to the oil vapors and non-condensible gases produced thereby, a solid residue is produced having a fixed carbon content of about 2–4% by weight. Oil shale constitutes the preferred embodiment of the carbonaceous solids contemplated to be treated in accordance with the method of the invention.

The solid heat-carrying bodies contemplated to be utilized in the method of the invention embrace any solids made up of materials which are inert in the process and maintain their physical characteristics under the conditions employed in the process to effect the pyrolysis of the solid carbonaceous materials. More specifically, the bodies should consist of materials which do not decompose, melt or fuse at temperatures encountered in the pyrolysis and heat-carrying body reheating zones. In addition, it is preferred that the bodies themselves do not disintegrate to any appreciable extent when subjected to the physical and thermal stresses inherent in the process. It will be understood, of course, that in this respect disintegration is to be distinguished from gradual wear by attrition.

Suitable materials for use in preparing the heat-carrying bodies include, without limitation, iron, steel, sand, alumina, ceramic compositions, spent ash and the like. It will be understood that as employed in the specification and claims of the application the term "spent ash" is meant to refer to the solid residual materials remaining after the solid residue (spent material) produced in the pyrolysis of carbonaceous solids is burned to remove at least a portion of any combustible substances present therein. For example, hereinafter in the specification and claims, the solid residue produced in the pyrolysis of oil shale is referred to as "spent shale" and the residual solid material remaining after spent shale is burned to combust any fixed carbon therein is referred to as "spent shale ash." In the case of materials, such as alumina and spent ash, which may be compressed into shapes and fired to form suitable heat-carrying bodies, these materials suitably may be combined with other additives which impart improved properties such as compression strength and resistance to thermal shock to the fired bodies. The heat-carrying bodies suitably may be of any shape, but the bodies preferred for use in the process are at least roughly spherical. All of the heat-carrying bodies employed in a particular embodiment of the method of the invention may be made up of the same material or mixtures of bodies composed of dissimilar materials suitably may be employed.

Since spent solids are continuously produced in the method of the invention and since such spent solids easily and eonomically can be converted to hot spent ash, a highly satisfactory heat-carrying solid, the heat-carrying bodies preferred for utilization in the method of the invention consist of the spent ash obtained as a by-product in the process. Since the conversion of spent solids to spent ash can be effected by heat obtained by burning gases produced in the process, the dependency of the process upon materials derived from external sources thereby can be essentially eliminated.

In the method of the invention the carbonaceous solid to be pyrolyzed is initially subjected to particle diminution by a suitable means such as crushing and the like. It will be understood that as employed hereinafter in the specification and claims that the term "crushed carbonaceous solids" is meant to refer to carbonaceous solids which have been subjected to size reduction by any suitable particle diminution process. In accordance with the method of the invention, carbonaceous solids of any particle size and particle size distribution suitably may be handled in the pyrolysis zone, including solids in very finely divided form. The particle-size reduction step of the method of the invention is carried out merely to expedite heat transfer to the solids in the pyrolysis zone. In actual practice, the average size distribution of the carbonaceous solid feed stream is dictated by an economic balance of the operating conditions of the process and, in particular, a balance between the expense of crushing and the cost of retorting. For example, the smaller the particle size of the carbonaceous solid feed, the smaller the volume of the pyrolysis zone in which the desired pyrolysis is effected. Generally, the maximum particle dimension would be about one inch without any special effort being made to produce a given amount of fine material or to restrict the production of fines in the diminution process resulting in a particular raw solids feed stream.

The crushed carbonaceous material suitably may be preheated indirectly or directly in any expedient means with heat from any source available which may be from within or from without the process, although the preheating thereof is not necessary. One preferred and convenient source of heat when heating of the raw carbonaceous material is employed is provided by the hot gases produced in combusting spent material obtained in the pyrolysis zone to convert it to hot spent ash heat-carrying bodies.

The cool or preheated crushed raw carbonaceous material is then introduced into the top of a confined vertical pyrolysis zone, wherein it is contacted by another stream of solid material entering near the top of the pyrolysis zone, which solid stream consists of suitable hotter solid heat-carrying bodies.

The stream of crushed raw solid carbonaceous material and the stream of heat-carrying bodies entering the pyrolysis zone are not fluidized. The inlet lines through which both streams enter the pyrolysis zone are sealed by any suitable means, such as with an inert gas, such as steam, or with a rotating multi-compartmented feed valve, to prevent vapor produced in the pyrolysis zone from escaping therefrom, to prevent gases from the outside, such as air or flue gas, from entering the pyrolysis zone, or to balance the pressure differences between the pyrolysis zone and other areas of the process equipment.

The heat-carrying bodies are at a temperature requisite to effect the desired pyrolysis of the carbonaceous solid material upon the transfer of their heat to said carbonaceous material. The actual temperature of the heat-carrying bodies required to effect the desired degree of pyrolysis of the carbonaceous material depends upon, inter alia, the composition, the average particle size, and the inlet temperature of the raw carbonaceous material, the weight ratio of heat-carrying bodies to carbonaceous feed, and the pressure conditions maintained in the pyrolysis zone.

The amount of heat-carrying bodies introduced into the pyrolysis zone suitably may be of any value such that the desired degree of pyrolysis of the carbonaceous feed material can be accomplished. Preferably, the amount of hot heat-carrying bodies fed to the pyrolysis zone is such that complete pyrolysis of the carbonaceous material can be effected without an appreciable excess of heat-carrying bodies being utilized. The weight ratio of heat-carrying bodies to carbonaceous material fed to the pyrolysis zone usually is in the range of from about 0.2:1 to about 5:1, preferably from about 0.5:1 to about 2:1, and, most desirably, from about 0.5:1 to about 1:1. Although larger amounts of heat-carrying bodies than those represented by the above ratios suitably may be employed in the process of the present invention, the utilization of such larger amounts does not result in any significant advantage and entails unnecessary additional equipment and operating expenditures.

The pyrolysis zone suitably may be maintained under any pressure which does not preclude or materially interfere with the desired production of effluent vapor therein. Although higher and lower pressures satisfactorily may be utilized, the pressure usually is maintained in the range of from about 10 to about 30 p.s.i.a. Preferably, the pressure employed is the autogenous pressure.

The mixture of the carbonaceous material and heat-carrying bodies move downwardly through the pyrolysis zone and heat is transferred from the hotter heat-carrying bodies to the carbonaceous material to effect the pyrolysis of the carbonaceous solid and produce an effluent vapor containing the desired hydrocarbon values and spent solids containing a decreasing amount of hydrocarbonaceous materials. The downward movement of the solids mixture is achieved by continually withdrawing a mixture of cooler heat-carrying bodies and spent material from the bottom of the pyrolysis zone. As heat is transferred to the carbonaceous materials flowing downwardly through the pyrolysis zone and effluent vapor thereby is produced, a vapor stream is continuously formed which rises upwardly through the solids mixture to the top of the pyrolysis zone. At the top of the pyrolysis zone, the carbonaceous material is richer in hydrocarbon values and the temperature of the heat-carrying bodies is at the maximum for the process. The major portion of all heat transferred to the carbonaceous material therefore takes place in the upper region of the pyrolysis zone, and the production of effluent vapor is greater there than at any other point in the zone. As the mixture of carbonaceous material and heat-carrying bodies flows downwardly through the pyrolysis zone, less and less effluent vapor is produced and, ultimately, a point is reached in the lower region of the retorting zone wherein the carbonaceous material is considered to be spent, preferably it is completely spent, and substantially no more vapor is produced. In addition, since no diluent gas is introduced into the pyrolysis zone at any point under normal operating conditions, at such a point substantially no vapor is present.

The diameter of the pyrolysis zone is selected so that the gas velocities of the total effluent vapor produced under the particular conditions utilized in the process are sufficient when rising upwardly through the upper region of the pyrolysis zone to thoroughly admix the raw carbonaceous feed and heat-carrying body streams immediately upon their incorporation into the upper region of the pyrolysis zone. While it is necessary that the diameter be so selected that admixture and agitation of the solid streams requisite for sufficient heat transfer therebetween is achieved, it is not a requirement for the selection of suitable diameters that gas velocities result which fluidize solids mixtures at any point in the pyrolysis zone. In some instances suspension and fluidization of the solids at the very top of the solids bed in the pyrolysis zone may occur, but in such instances the fluidization must be restricted to the solids in the upper region of the pyrolysis zone if satisfactory results are to be achieved in the process.

In accordance with the method of the present invention, it is preferred that gas velocities be controlled to be below fluidization values so that a minimum amount of fine solid materials becomes entrained in the effluent vapor stream leaving the top of the solids bed.

Even when the operating conditions of the process are so controlled that gas velocities result which are below the level necessary for the formation of a completely fluidized solids bed, a portion of the very fine materials in the bed is elutriated therefrom and carried overhead in the effluent vapor product stream. These suspended fine materials in the product stream suitably may be removed by any expedient means. In a preferred embodiment of the method of the invention, entrained solids are removed from the product vapor stream in a cyclone located within the uppermost region of the pyrolysis zone, and the fine materials thereby removed are recycled to a point in the solids bed in the pyrolysis zone at which very little or no effluent vapor is being produced. These recycled fine materials then pass from the bottom of the pyrolysis zone with the spent materials and cooler heat-carrying bodies. Of course, the actual amount of fine solids elutriated from the solids bed in the pyrolysis zone for a particular process depends upon the conditions employed for that process.

The carbonaceous material is maintained in the pyrolysis zone in contact with the heat-carrying bodies in a non-combustion supporting atmosphere for a time period requisite for the desired hydrocarbon values, preferably substantially all of the hydrocarbon values, to be driven from the carbonaceous solids. Although the actual residence time for the carbonaceous material in the retorting zone, of course, will vary depending on the particular conditions employed in a process, the residence times required in accordance with the method of the invention in order to effect complete pyrolysis of carbonaceous solids are on the order of from about one to about ten minutes. Although residence times longer than about ten minutes suitably can be utilized in the method of the invention, the use thereof results in no particular advantage.

The mixture of spent material and cooler heat-carrying bodies is removed from the bottom of the pyrolysis zone. The heat-carrying bodies are recovered from mixture containing the spent material, reheated, and then recycled to the top of the pyrolysis zone to effect the pyrolysis of additional raw carbonaceous material added thereto. When spent ash derived from the spent solids is employed as the solid heat transfer medium, it is unnecessary to subject the solids stream issuing from the bottom of the pyrolysis zone to a separation step, although a selection as to the desired particle size distribution of solid material desired to be recycled to the pyrolysis zone suitably can be made at this point in the process. In instances wherein materials other than spent ash derived from the carbonaceous solids are employed as the heat-carrying bodies, the separation and recovery of the heat-carrying bodies from the spent material suitably can be effected by any expedient means, such as screening, elutriating and the like. Of course, it will be understood that a portion of the spent solids can be allowed to remain with heat-carrying bodies composed of extraneous materials, converted to spent ash during the reheating of the dissimilar heat-carrying bodies, and recycled to the pyrolysis zone to serve as supplemental heat-carrying medium.

The reheating of the heat-transfer bodies employed in the process of the present invention satisfactorily may be carried out by any suitable means, such as in a pebble heater, a fluidized solids bed containing the heat-transfer bodies, and the like. In reheating the heat-transfer bodies, heat suitably may be imparted thereto by direct or indirect means employing any convenient source of heat as the heating expedient. Since spent materials produced in the method of the invention contain combustible material in the form of fixed carbon and any hydrocarbon values which were not driven therefrom and/or which were absorbed thereby in the pyrolysis zone, at least a portion of the combustible substances present in spent material recovered from the pyrolysis zone suitably can be burned, and preferably is combusted, to provide at least a portion of the heat required for raising the temperature of the heat-carrying bodies to that required to produce the desired degree of pyrolysis of the carbonaceous materials. Combustion of the spent material can be accomplished by any suitable manner, such as by forcing a combustion-supporting gas, such as air, an oxygen-containing flue gas and the like, through a fluidized spent solids combustion bed, an entrained-solids combustion line and the like, and then passing the hot gases and/or hot solids produced thereby in direct or indirect contact with the heat-carrying bodies desired to be heated. In instances wherein the heat supplied by burning spent materials is insufficient to raise the temperature of the heat-carrying bodies to the desired level, a portion of the gases recovered from the pyrolysis zone can be burned to provide the additional heat required.

In the preferred embodiment of the method of the invention wherein spent ash derived from raw carbonaceous material treated in the process is utilized as the solid heat-carrying medium, the solids mixture recovered from the bottom of the pyrolysis zone consists of spent materials and spent ash heat-carrying bodies. The solids mixture recovered thereby contains an appreciable proportion of finely divided materials. Although a significant proportion of these fine materials, or their combusted counterparts, suitably may be employed in the reheated heat-carrying body stream ultimately fed to the pyrolysis zone, in order to restrict the total solids flow in the pyrolysis zone and prevent an undesirable buildup of solids in the system, the majority of the fine materials preferably are removed from the system and are not recycled to pyrolysis zone. The separation of the coarser materials desired to be ultimately recycled to the pyrolysis zone from the finer materials suitably may be made either before or after the coarser bodies are heated to pyrolysis zone inlet temperatures. Preferably, since the finer materials contain combustible materials which can be burned to aid in the heating of the coarser bodies, separation of the coarse and fine streams is postponed until after the heating of the coarse stream.

Preferably, the reheating of the cool solid mixture recovered from the bottom of the pyrolysis zone is accomplished by contacting it with a combustion-supporting gas having a temperature at which the combustible matter in the spent material-spent ash mixture is ignited, and the mixture thereby is heated to pyrolysis zone inlet temperatures. The combustion-supporting gas, as hereinabove stated, suitably may be air, a flue gas containing a sufficient amount of oxygen and the like.

In order to raise the temperature of the combustion-supporting gas to the desired value whereby the requisite heating of the solids mixture can be effected thereby, a supplemental source of heat is required. In the preferred embodiment of the method of the invention, the source of the additional heat required to raise the combustion-supporting gas to temperatures at which the combustible matter in the spent material-spent ash mixture is ignited is provided by hydrocarbon fuels produced in the process. Although the combustion of the solids mixture may be carried out by other means, such as in fluidized solids beds, stacked solids beds and the like, the preferred manner for burning the spent solids-spent ash mixture is in a pneumatic combustion line in which the solids are entrained and lifted during combustion to a height from which they can be re-introduced into the top of the pyrolysis zone. The supplemental fuel initially may be burned in the pneumatic gas lift line to preheat the combustion-supporting gas to the required solids-combustion temperatures, with the solids subsequently being introduced into the hot gas in the lift line, entrained, and combusted. Alternatively, the solids initially may be introduced into and entrained in the combustion-supporting gas in the gas lift line, with the supplemental fuel being subsequently introduced and burned substantially simultaneously with the combustible matter in the spent solids-spent ash mixture.

After combustion is completed in the gas lift line and spent material is converted into hot spent ash, the gas containing the spent ash suspended therein is passed through a first gas-solids separation zone wherein the coarser particles of spent ash are selectively removed. This coarse fraction of spent ash is then recycled to the top of the pyrolysis zone wherein it serves as the solid heat-carrying medium and contacts additional raw carbonaceous material to effect the pyrolysis thereof. The finer particles of spent ash remain suspended in the gas leaving the first gas-solids separation zone which is then passed to a second gas-solids separation zone wherein the fine spent ash is removed therefrom. A portion of the fine material obtained from the second gas-solids separation zone may be recycled to the pyrolysis zone to supplement heat available for effecting pyrolysis due to the use of the hot recycled coarse matrial. When a recycling of this fine material is employed, it is preferred that the stream of the fine hot solids be introduced into the solids bed in the pyrolysis zone at a point well below the upper surface of the bed, so that the fine heat-carrying bodies become thoroughly agitated and admixed into the solids bed by effluent vapor produced and rising upwardly therein without being swept out of the bed.

Although the above description is limited to the utilization of only one coarse spent ash recycle stream and one fine spent ash recycle stream, it will be understood that a further classification of each of the spent ash streams suitably could be made, and such streams resulting therefrom could be employed in the pyrolysis zone in accordance with the method of the present invention. In such instances, the distance from the top of the solids bed at which a particular hot spent ash recycle stream is introduced into the pyrolysis zone preferably varies depending upon the average particle size of spent ash solids comprising that stream. For example, as the particle size of the material in a recycle stream becomes smaller, the distance below the surface of the solids bed at which the stream suitably can be introduced becomes progressively greater.

The remainder of the fine material obtained from the second gas-solids separation zone may be discarded as waste material, but more preferably, it is subjected to a further treatment to recover the sensible heat thereof prior to its disposal. In a preferred embodiment of the method of the invention, the hot fine solids obtained from the second gas-solids separation zone and not recycled to the pyrolysis zone are employed as a preheating expedient for the combustion-supporting gas employed in burning the spent ash-spent solids mixture in the gas-lift combustion zone. Preferably, the hot fine solids stream is entrained in the combustion-supporting gas to impart its heat thereto, and then the fine materials are removed in a third gas-solids separation zone prior to the burning of combustible materials in the gas-lift combustion line.

In a further embodiment of the present invention, the hot flue gases obtained in the second gas-solids separation zone may be employed to preheat raw carbonaceous material being fed to the pyrolysis zone. The desired preheating may be accomplished by either direct or indirect heat transfer to the raw carbonaceous solids feed. Preferably, the raw carbonaceous material is entrained in the hot flue gas stream and then removed therefrom by means of a suitable gas-solids separator.

The invention will be more fully understood by reference to the following detailed description of an example of the more preferred embodiment of the method of the invention and the accompanying drawing which represents a flow diagram of the method so described wherein Colorado oil shale is employed as the feed stream.

As shown in FIG. 1 Colorado oil shale at about 50° F. having a maximum partcile size of about ½" in diameter is fed at a rate of about 426,000 pounds per hour to the top of a vertical pyrolysis zone 3 from bin 1 by line 2. The pyrolysis zone has a diameter of about 4.6 feet and is maintained at a pressure of about 16.5 p.s.i.a. Coarse hot spent shale ash and fine hot spent shale ash at about 1,450° F. are introduced into the upper region of pyrolysis zone 3 via line 4 and line 5, respectively. The total charge of hot spent shale ash is about 582,000 pounds per hour. In pyrolysis zone 3 heat is transferred from the hot spent shale ash to the raw shale and an effluent vapor is produced having a velocity in the upper region of the zone of about 3 feet per second.

The effluent vapor produced in pyrolysis zone 3 leaves pyrolysis zone 3 at about 870° F. through line 9 via a cyclone 8 located at the top of and within pyrolysis zone 3. In cyclone 8 solids entrained in the effluent vapor stream leaving pyrolysis zone 3 are removed therefrom at a rate of about 80,000 pounds per hour and recycled to a point within the solids bed in pyrolysis zone 3 at which little effluent vapor is formed.

The solids mixture passes downwardly through pyrolysis zone 3 at a rate of about 14 feet per minute which results in a residence time in pyrolysis zone of about 3 minutes. The solids mixture reaching the bottom of pyrolysis zone 3 contains spent shale and spent shale ash which are at a temperature of about 870° F. and which are removed from pyrolysis zone 3 via line 6 at a rate of about 934,000 pounds per hour. The spent shale-spent shale ash mixture is sent to combustion line 13 via line 7 wherein the combustible material therein is combusted and the spent shale ash stream produced is thereby heated prior to being recycled to retorting zone 3.

In combustion line 13 the solids stream is contacted with about 384,000 cubic feet per minute of a hot gas stream at about 2,100° F. resulting from the burning in air of fuel gas produced in the process. The combustion is carried out by passing air at about 50° F. through a blower 11 from line 12 into line 13 whereby it is slightly compressed and heated to about 90° F. Fuel gas is then introduced by means of line 19 and burned to raise the temperature of the gas to about 2,100° F. The hot gas rises up through line 13, and the spent shale-spent shale ash solids are introduced into line 13 through line 7, are entrained therein, and combustible matter in the solids mixture is ignited and burned. The hot products of the combustion, gases and spent shale ash, at about 1,450° F. are sent to cyclone 14 via line 13 wherein the hot coarse spent shale ash is removed therefrom and recycled to the top of pyrolysis zone 3 by means of line 4. The fine spent shale ash remains entrained in the gas stream leaving cyclone 14 via line 15 and is passed therewith to cyclone 16. In cyclone 16 about 308,000 pounds per hour of fine spent shale ash is removed from the gas stream fed thereto with a substantially dust-free flue gas being obtained from cyclone 16 though line 17. About 95% of the fine spent shale ash removed in cyclone 16 is discarded through line 18. The remaining 5% of the fine spent shale ash is recycled to pyrolysis zone 3 via line 5 wherein it contacts additional raw shale to effect the pyrolysis thereof. The hot fine spent shale ash is introduced into pyrolysis zone 3 at a point below that at which the recycled hot, coarse spent shale ash enters.

Figure 2:
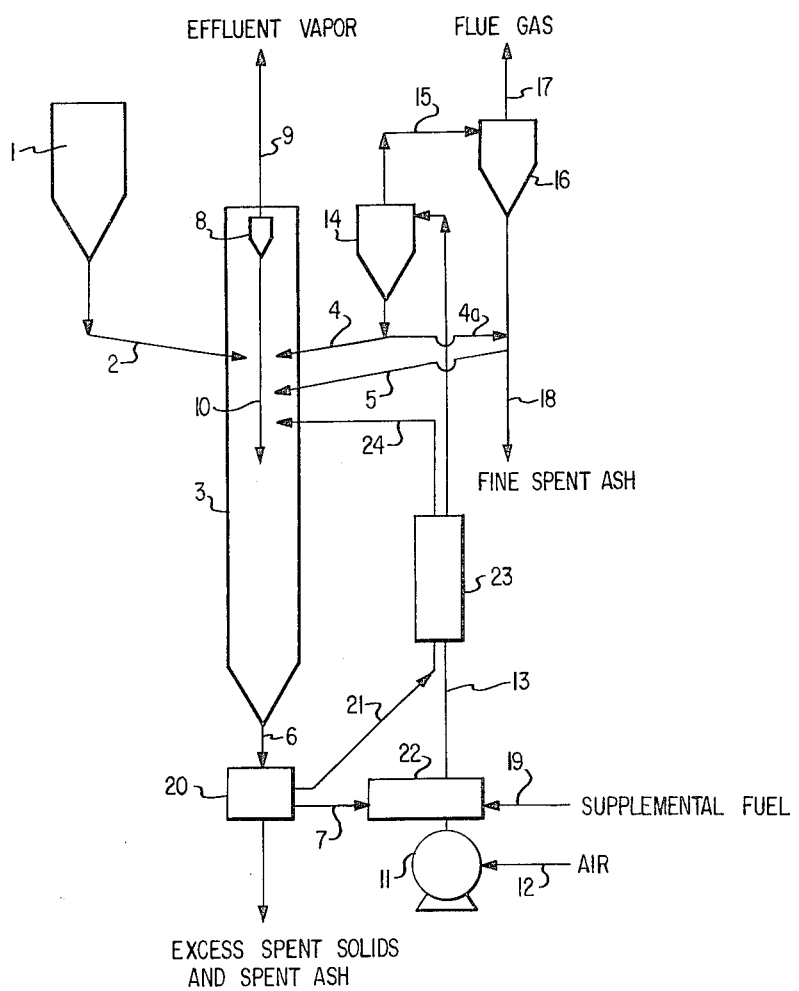

In the modification shown in FIG. 2 the solids mixture comprising heat-carrying bodies, spent shale and spent shale ash is removed from the pyrolysis zone 3 via line 6 and passes into separator 20. The spent shale-spent shale ash mixture is separated therein from the heat-carrying bodies and is passed via line 7 to combustion zone 22 which may, for example, be a combustion bed as described previously. Combustion is carried out therein by passing air through a blower 11 from line 12 into combustion zone 22. Here fuel gas is introduced by means of line 19 and is burned therein to further raise the temperature of the resulting gas. The hot gas rises through line 13 and into indirect heat transfer zone 23. The heat-carrying bodies recovered in separator 20 are passed via line 21 through indirect heat transfer zone 23, thus heat is transferred from the hot gases to the heat-carrying bodies without direct contact. The reheated heat-carrying bodies may then be transferred via line 24 back into pyrolysis zone 3. Any solids retained in the heating gases may be recovered in cylones 14 and 16 as described previously. If desired these may be returned to the pyrolysis zone through lines 4 and 5 as was described previously, or may be discharged through lines 4a and 18.

While in the description of the method of the present invention given hereinabove it is stated that effluent vapor "free from extraneous gases" may be recovered from the top of the pyrolysis zone, as will be understood by one skilled in the art of pyrolyzing solid carbonaceous materials, a prudent design of a pyrolysis zone, operating in accordance with the present method, should include means in the bottom of the pyrolysis zone for introducing therein, either continuously or periodically, a "shot" of a gas, including extraneous gases such as steam and the like, to loosen solids which might become jammed and clogged in the bottom of the retorting zone.

In addition, in embodiments of the method of the invention wherein a gas seal is employed in either or both of the raw solids and heat-carrying bodies feed lines to the pyrolysis zone, a minor amount of the sealing gas may leak into the pyrolysis zone and be withdrawn overhead therefrom with the effluent vapor produced in the process. It will be understood that such introductions of gas into the effluent vapor stream is accidental or only for convenience sake and are not in any way parts of or deviations from the inventive concept embodied in the method of the present invention. Accordingly, as employed in the specification and claims, in describing the character of the effluent vapor obtained from the top of the pyrolysis zone, the phrase "free from extraneous gases," is meant to be embracive of effluent vapor diluted by small amounts of extraneous gases which have been introduced into the pyrolysis zone essentially for purposes such as described above and not for heat transfer purposes.

Since modifications of the method of the invention which do not depart from its scope will become apparent from the general description and specific embodiments appearing in the specifications, it is intended that this invention be limited solely by the scope of the appended claims.

What I claim is:

1. A method for continuously producing an effluent vapor from a solid carbonaceous material, which material upon pyrolysis leaves a solid residue, which comprises introducing crushed solid carbonaceous material and hotter solid heat-carrying bodies into the upper region of a vertical pyrolysis zone wherein said heat-carrying bodies contact said carbonaceous material and impart their heat to said carbonaceous material in a non-combustion supporting atmosphere to effect the pyrolysis of said carbonaceous material and produce an effluent vapor, causing said solids to pass downwardly through said pyrolysis zone with the production of a lessening amount of effluent vapor from said carbonaceous material, said effluent vapor produced rising upwardly through said pyrolysis zone and attaining a velocity in the upper region of said pyrolysis zone such that solids in the upper region of said pyrolysis zone are thoroughly agitated thereby, causing said solids to continue passing downwardly through said pyrolysis zone until a point is reached in the lower region of said pyrolysis zone wherein essentially no gaseous substances are produced or are present, removing said effluent vapor from the top of said pyrolysis zone free from extraneous gases, removing solid residue produced by the pyrolysis of said carbonaceous material from the bottom of said pyrolysis zone, recovering said heat-carrying bodies from the bottom of said pyrolysis zone, reheating said heat-carrying bodies and recycling only heated heat-carrying bodies to the upper region of said pyrolysis zone to contact and effect the pyrolysis of solid carbonaceous material continuously added thereto.

2. The method according to claim 1, wherein said solid carbonaceous material is oil shale.

3. The method according to claim 1 wherein said heat-carrying bodies are at least partly reheated by combusting at least a portion of said spent solid residue and passing the resulting products of combustion in direct contact with said heat-carrying bodies.

4. The method according to claim 1 wherein said heat-carrying bodies are at least partly reheated by combusting at least a portion of said spent solid residue and passing the resulting products of combustion in indirect heat transfer with said heat-carrying bodies.

5. The method according to claim 1 wherein said heat-carrying bodies comprise solid spent ash produced by the combustion of at least a portion of said spent solid residue.

6. The method according to claim 1 wherein the weight ratio of said heat-carrying bodies to said carbonaceous material is in the range of from about 0.2:1 to about 5:1.

7. The method according to claim 1 wherein said pyrolysis zone is maintained at autogenous pressures.

8. A method for continuously producing an effluent vapor from oil shale which upon pyrolysis leaves a spent shale residue, which comprises introducing crushed oil shale and hotter solid spent shale ash into the upper region of a vertical pyrolysis zone wherein said spent shale ash contacts said oil shale and imparts its heat to said oil shale in a non-combustion supporting atmosphere to effect the pyrolysis of said oil shale and produce an effluent vapor, causing said solids to pass downwardly through said pyrolysis zone with the production of a lessening amount of effluent vapor from said oil shale, said effluent vapor produced rising upwardly through said pyrolysis zone and attaining a velocity in the upper region of said pyrolysis zone such that solids in the upper region of said pyrolysis zone are thoroughly agitated thereby, causing said solids to continue passing downwardly through said pyrolysis zone until a point is reached in the lower region of said pyrolysis zone wherein essentially no gaseous substances are produced or are present, removing said effluent vapor from the top of said pyrolysis zone free from extraneous gases, removing a mixture of spent shale residue and spent shale ash from the bottom of said pyrolysis zone, heating at least a portion of said spent shale residue and spent shale ash, and recycling at least a portion of said heated spent shale residue and spent shale ash to the upper region of said pyrolysis zone to contact and effect the pyrolysis of solid carbonaceous material continuously added thereto.

9. The method according to claim 8 wherein the weight ratio of spent shale ash to oil shale is in the range of from about 0.2:1 to about 5:1.

10. The method according to claim 8 wherein said pyrolysis zone is maintained under autogenous pressures.

11. The method according to claim 8 wherein said heating of said mixture containing spent shale residue and spent shale ash is carried out at least in part by combusting said mixture in a combustion-supporting gas.

12. The method according to claim 8 wherein the heating of said mixture containing spent shale residue and spent shale ash is accomplished by entraining said mixture in a hot combustion-supporting gas to convert the spent shale residue in said mixture to spent shale ash and the coarser portion of the spent shale ash particles in the solids mixture produced thereby is selectively removed from the spent shale ash mixture and recycled to the pyrolysis zone.

References Cited in the file of this patent
UNITED STATES PATENTS

| | | |
|---|---|---|
| 2,595,338 | Creelman | May 6, 1952 |
| 2,639,263 | Leffer | May 19, 1953 |
| 2,676,908 | Noel | Apr. 27, 1954 |
| 2,677,650 | Welinsky | May 4, 1954 |
| 2,982,701 | Scott | May 2, 1961 |